United States Patent
Kurian et al.

(10) Patent No.: US 11,741,248 B2
(45) Date of Patent: Aug. 29, 2023

(54) DATA ACCESS CONTROL USING DATA BLOCK LEVEL ENCRYPTION

(71) Applicant: Bank of America Corporation, Charlotte, NC (US)

(72) Inventors: Manu J. Kurian, Dallas, TX (US); Michael R. Young, Davidson, NC (US); Jo-Ann Taylor, Godalming (GB)

(73) Assignee: Bank of America Corporation, Charlotte, NC (US)

( * ) Notice: Subject to any disclaimer, the term of this patent is extended or adjusted under 35 U.S.C. 154(b) by 269 days.

(21) Appl. No.: 16/545,169

(22) Filed: Aug. 20, 2019

(65) Prior Publication Data

US 2021/0056216 A1 Feb. 25, 2021

(51) Int. Cl.
*G06F 21/60* (2013.01)
*G06F 21/62* (2013.01)

(52) U.S. Cl.
CPC ........ *G06F 21/6209* (2013.01); *G06F 21/602* (2013.01); *G06F 21/6227* (2013.01); *G06F 2221/2107* (2013.01)

(58) Field of Classification Search
CPC ............... G06F 21/6209; G06F 21/602; G06F 21/6227; G06F 2221/2107
See application file for complete search history.

(56) References Cited

U.S. PATENT DOCUMENTS

| | | |
|---|---|---|
| 5,264,159 A | 11/1993 | Kung |
| 5,375,244 A | 12/1994 | McNair |
| 5,838,814 A | 11/1998 | Moore |
| 5,872,848 A | 2/1999 | Romney et al. |
| 5,940,507 A | 8/1999 | Cane et al. |
| 5,987,440 A | 11/1999 | O'Neil et al. |
| 6,275,936 B1 | 8/2001 | Kyojima et al. |
| 6,570,988 B1 | 5/2003 | Venkatesan et al. |
| 6,643,648 B1 | 11/2003 | Ross et al. |
| 7,676,433 B1 | 3/2010 | Ross et al. |
| 8,094,813 B2 | 1/2012 | Ciet et al. |
| 8,140,809 B2 | 3/2012 | Farrugia et al. |

(Continued)

FOREIGN PATENT DOCUMENTS

WO 2009139650 A1 11/2009

OTHER PUBLICATIONS

Kurian, M. J. et al., "Data Access Control Using Data Block Level Decryption," U.S. Appl. No. 16/545,216, filed Aug. 20, 2019, 32 pages.

*Primary Examiner* — Trang T Doan
*Assistant Examiner* — Vladimir I Gavrilenko

(57) ABSTRACT

An information security system that includes a data control engine configured to receive a data file and to segment the data file into a set of data blocks that each contain a portion of data from the data file. The data control engine is further configured to associate the set of data blocks with a reference tag and to store an association between the set of data blocks and the reference tag. The data control engine is further configured to identify an access key for encrypting each data block, to encrypt each data block with a corresponding access key, and to store an association between each data block and each corresponding access key. The data control engine is further configured to store each data block in a memory and to store location information identifying the location of each data block in the memory.

20 Claims, 5 Drawing Sheets

(56) References Cited

U.S. PATENT DOCUMENTS

| | | |
|---|---|---|
| 8,265,272 B2 | 9/2012 | Schneider |
| 8,300,809 B2 | 10/2012 | Ciet et al. |
| 8,332,649 B2 | 12/2012 | Yokota et al. |
| 8,397,065 B2 | 3/2013 | Lin et al. |
| 8,649,522 B2 | 2/2014 | Dancer et al. |
| 8,687,800 B2 | 4/2014 | Patel |
| 8,843,762 B2 | 9/2014 | Troncoso Pastoriza et al. |
| 9,092,148 B2 | 7/2015 | Leggette |
| 9,116,712 B2 | 8/2015 | Miller et al. |
| 9,143,317 B2 | 9/2015 | Chevallier-Mames et al. |
| 9,495,544 B2 | 11/2016 | Aissi et al. |
| 9,805,109 B2 | 10/2017 | Wada |
| 9,807,066 B2 | 10/2017 | Aissi et al. |
| 9,923,874 B2 | 3/2018 | Wan et al. |
| 10,104,045 B2 | 10/2018 | Resch |
| 10,114,941 B2 | 10/2018 | Pedersen |
| 2002/0178370 A1 | 11/2002 | Gurevich et al. |
| 2003/0084294 A1 | 5/2003 | Aoshima et al. |
| 2004/0019796 A1 | 1/2004 | Wang |
| 2004/0049687 A1 | 3/2004 | Orsini et al. |
| 2005/0138353 A1 | 6/2005 | Spies et al. |
| 2005/0163079 A1 | 6/2005 | Taniuchi et al. |
| 2005/0235145 A1 | 10/2005 | Slick et al. |
| 2006/0153375 A1 | 7/2006 | Yi |
| 2007/0183600 A1 | 8/2007 | Smart |
| 2008/0022389 A1 | 1/2008 | Calcev et al. |
| 2009/0103734 A1 | 4/2009 | Hammell et al. |
| 2009/0228708 A1 | 9/2009 | Trostle |
| 2010/0269008 A1 | 10/2010 | Leggette et al. |
| 2012/0079282 A1 | 3/2012 | Lowenstein et al. |
| 2012/0084464 A1 | 4/2012 | Cochinwala et al. |
| 2013/0013931 A1* | 1/2013 | O'Hare .......... H04L 9/3231 713/189 |
| 2013/0301827 A1 | 11/2013 | Mueller et al. |
| 2014/0281486 A1* | 9/2014 | Nayshtut .......... H04L 63/061 713/153 |
| 2015/0293850 A1* | 10/2015 | Shindo .......... G06F 12/0862 711/137 |
| 2016/0080146 A1 | 3/2016 | Gauravaram |
| 2017/0039372 A1* | 2/2017 | Koval .......... H04L 67/06 |
| 2018/0060612 A1 | 3/2018 | Gladwin et al. |
| 2019/0108366 A1 | 4/2019 | Resch et al. |
| 2019/0108368 A1 | 4/2019 | Gladwin et al. |
| 2019/0147182 A1* | 5/2019 | Arora .......... G06F 21/602 726/28 |
| 2021/0011623 A1* | 1/2021 | Fay .......... G06F 16/9035 |

* cited by examiner

| 402 | 404 | 406 | 408 | 410 | 412 | 414 |
|---|---|---|---|---|---|---|
| Reference Tag | File Name | Data Block | Location Information | Access Key | Security Flag | File Key |
| 123 | File 1 | A | Location 1 | Key 1 | 0 | N/A |
| 123 | File 1 | B | Location 2 | Key 2 | 0 | N/A |
| 123 | File 1 | C | Location 3 | Key 3 | 0 | N/A |
| 456 | File 2 | D | Location 4 | Key 4 | 0 | Key 10 |
| 456 | File 2 | E | Location 5 | Key 5 | 0 | Key 10 |
| 456 | File 2 | F | Location 6 | Key 6 | 0 | Key 10 |
| 456 | File 2 | G | Location 7 | Key 7 | 1 | Key 10 |
| 456 | File 2 | H | Location 8 | Key 8 | 0 | Key 10 |

DATA ACCESS CONTROL USING DATA BLOCK LEVEL ENCRYPTION

TECHNICAL FIELD

The present disclosure relates generally to information security, and more specifically to data access control using data block level encryption and decryption.

BACKGROUND

Many computer systems have expansive networks that include a large number of network devices. These computer systems allow data to be shared among the different network devices. One of the technical challenges that occurs in a computer system is controlling unauthorized access to data and data exfiltration. For example, a bad actor may employ malware to access and exfiltrate data from a network. Existing systems lack the ability to restrict access to information within a data file once a bad actor has obtained unauthorized access to the data file. In other words, once a bad actor is able to access a data file, they will be able to access all of the information within the data file. Existing approaches may attempt to protect a data file by password protecting the data file. However, if a bad actor is able to bypass the password protection and open the file, then the system is unable to restrict the bad actor from accessing all of the information within the data file.

SUMMARY

Many computer systems have expansive networks that include a large number of network devices. These computer systems allow data to be shared among the different network devices. One of the technical challenges that occurs in a computer system is controlling unauthorized access to data and data exfiltration. For example, a bad actor may employ malware to access and exfiltrate data from a network. Once a bad actor is able to access a data file, they are able to access all of the information within the data file. Existing systems lack the ability to restrict access to information within a data file once a bad actor has obtained unauthorized access to the data file. Existing approaches may attempt to protect a data file by password protecting the data file. However, if a bad actor is able to bypass the password protection and open the file, then the system is unable to restrict the bad actor from accessing all of the information within the data file.

The system disclosed in the present application provides a technical solution to the technical problems discussed above by providing data block level encryption. The disclosed system provides several practical applications and technical advantages which include 1) a process for securely storing data files a set of encrypted data blocks that are distributed in a memory and 2) a process for identifying and recovering data files that are stored in memory as encrypted data blocks.

In one embodiment, an information security system is configured to receive a data file and to segment the data file into a set of data blocks. The information security system is further configured to associate the set of data blocks with a reference tag and to store an association between the set of data blocks and the reference tag in a data information table. The information security system is further configured to identify an access key for encrypting each data block, to encrypt each of the data blocks using an identified access key, and to store an association between the set of data blocks and their respective access keys in the data information table. The information security system is further configured to store each of the encrypted data blocks in a memory and to store location information that identifies the location of each data block in the data information table. In one embodiment, the set of data blocks are not stored contiguous or sequentially together in the memory. This process provides increased information security by storing data files such that a bad actor will need to know the access keys that are associated with a data file and the location of the data blocks that are associated with the data file in order to access the information within the data file. In the event that a bad actor is able to compromise one data block, they will be unable to access all of the information within the data file.

In one embodiment, the information security system is configured to receive a data request that identifies a reference tag that is associated with a data file. The information security system is further configured to identity a set of encrypted data blocks that are linked with the reference tag in a data information table. The information security system is further configured to identify location information for the set of encrypted data blocks and to extract the set of encrypted data blocks from a memory based on the location information. The information security system is further configured to identify access keys that are associated with each data block from the set of data blocks and to decrypt the set of encrypted data blocks using the identified access keys. The information security system is further configured to reconstruct the data file using the decrypted set of data blocks. The process allows the system to identify and decrypt data blocks that are associated with a data file which allows the system to access and recover the original data file.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Information Security System

Figure 1:
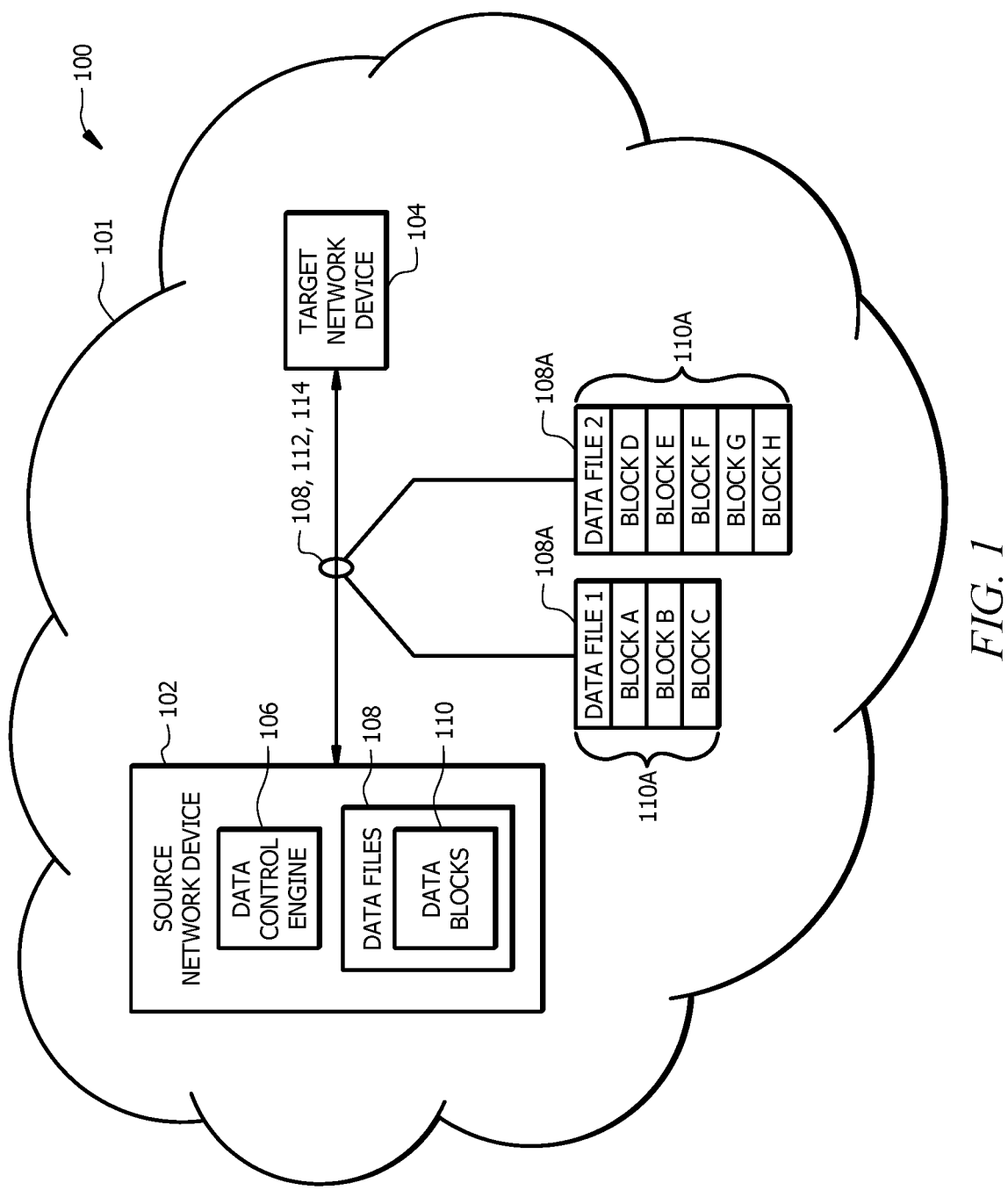
FIG. 1 is a schematic diagram of an information security system configured to employ data block level encryption.

FIG. 1 is a schematic diagram of an information security system 100 configured to employ data block level encryption. In one embodiment, the information security system 100 comprises a network device 102 that is in signal communication with one or more other network devices 104 in a network 101. The information security system 100 may be configured as shown or in any other suitable configuration.

The network 101 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 101 may be configured to support any suitable type of communication protocol as would be appreciated by one of ordinary skill in the art.

Network Device with Data Control Engine

The network device 102 is in signal communication with other network devices 104 using one or more network connections. The network device 102 may employ any suitable type of network connection and/or communication protocol as would be appreciated by one of ordinary skill in the art. Additional information about the hardware configuration of the network device 102 is described in FIG. 6.

Examples of network devices 102 and 104 include, but are not limited to, computers, databases, web servers, or any other suitable type of network device. In one embodiment, a network device 102 comprises a data control engine 106 and is configured to data files 108 and data blocks 110. In one embodiment, the data control engine 106 is configured to provide information security by storing data files 108 as a plurality of encrypted data blocks 110. An example of the data control engine 106 operating in this configuration is described in FIG. 2. In one embodiment, the data control engine 106 is configured to retrieve from memory data files 108 that are stored as encrypted data blocks 110 and to transmit the retrieved data files 108 to other network devices 104 as part of a data stream 114. An example of the data control engine 106 operating in this configuration is described in FIG. 5.

Data File Encryption Process

Figure 2:
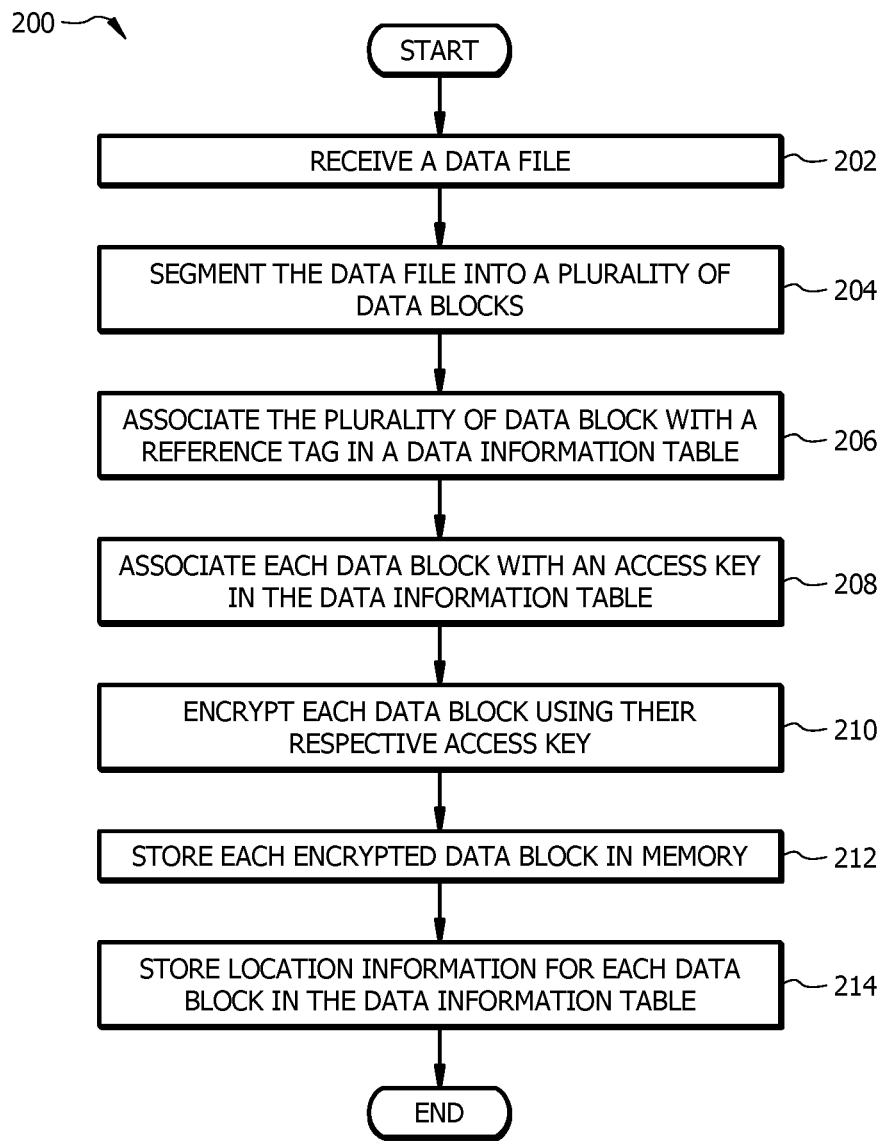
FIG. 2 is a flowchart of an embodiment of an encrypted data storage method.

FIG. 2 is a flowchart of an embodiment of an encrypted data storage method 200. A data control engine 106 may employ method 200 to securely store data files 108 in a memory by storing the data file 108 as a set of encrypted data blocks 110. In existing systems, when a bad actor is able to access a data file 108 they are able to access all of the information within the data file 108. In contrast, the data control engine 106 provides increased information security by storing data files 108 such that a bad actor will need to know the access keys 410 associated with the data file 108 and the location of the data blocks 110 for the data file 108 in order to access the information within the data file 108. In the event that a bad actor is able to compromise one data block 110 they will still be unable to access all of the other information in the data file 108. This process provides improved information security by providing multiple layers of protection. For example, the data control engine 106 may provide a first level of security that encrypts individual data blocks 110 within a data file 108 as well as additional levels of security that may encrypt or password protect the file as a whole. Each additional layer of security increases the difficulty and complexity associated with gaining unauthorized access to the contents of a data file 108.

At step 202, the data control engine 106 receives a data file 108. Examples of data files 108 include, but are not limited to, text documents, spreadsheets, presentations, music files, video files, images, or any other suitable type of data. In one embodiment, the data control engine 106 is configured to receive the data file 108 from an application after the application generates or modifies the data file 108. For example, a user may use a word processing application to generate a text file. When the user wants to save the text file, the word processing application may send the text file to the data control engine 106 for encryption and storage. As another example, a user may use an application to generate a document (e.g. a spreadsheet) that contains account information for a set of customers. When the user wants to save the document, the application may send the document to the data encryption engine 106 for encryption and storage. In another embodiment, the data control engine 106 may be configured to obtain the data file 108 from memory (e.g. memory 604). For example, a user may identify a data file 108 that is stored in memory to be converted into a plurality of encrypted data blocks 110. In other embodiments, the data control engine 106 may receive the data file 108 from any other suitable source.

Figures 3, 4:
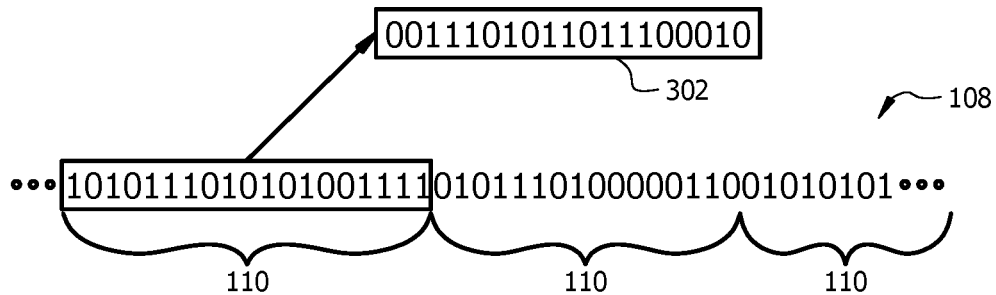
FIG. 3 is an example of a data file segmented into data blocks.
FIG. 4 is an embodiment of a data information table.

At step 204, the data control engine 106 segments the data file 108 into a plurality of data blocks 110. Each data block 110 comprises a portion of the data from the data file 108. A data file 108 may represent data in memory as a string of numeric values (e.g. a binary string). Referring to FIG. 3 as an example, the data file 108 is represented as a binary string. In this example, the data control engine 106 may generate data blocks 110 by dividing the binary string into a plurality of segments that each contain a portion of the data from the data file 108. The data control engine 106 may segment the data file 108 into any suitable number of data blocks 110. For example, the data control engine 106 may segment the data file 108 into two, four, ten, a hundred, a thousand, or any other suitable number of data blocks 110.

Returning to FIG. 2 at step 206, the data control engine 106 associates the plurality of data blocks 110 with a reference tag 402 in a data information table 400. A reference tag 402 is an identifier that is linked with one or more data blocks 110. For example, a reference tag 402 may be an alphanumeric value that is uniquely linked with one or more data blocks 110. The reference tag 402 allows the data control engine 106 to identify any data blocks 110 that are associated with a particular data file 108. Referring to FIG. 4 as an example, the data control engine 106 may link a reference tag 402 that has a value of "123" with data block A, data block B, and data block C. In this example, the reference tag 402 identifies the data blocks 110 (i.e. data block A, data block B, and data block C) that are associated with a first data file (i.e. File 1). As another example, the data control engine 106 may link a reference tag 402 that has a value of "456" with data block D, data block E, data block F, data block G, and data block H. In this example, the reference tag 402 identifies the data blocks 110 (i.e. data block D, data block E, data block F, data block G, and data block H) that are associated with a second file (i.e. File 2). The data control engine 106 may store the association between the reference tag 402 and one or more data blocks 110 in a data information table 400. The data information table 400 may be configured to link reference tags 402, file identifiers 404, and data block identifiers 406.

Returning to FIG. 2 at step 208, the data control engine 106 associates each data block 110 with an access key 410 in the data information table 400. An access key 410 may be used for encrypting and decrypting data blocks 110. Examples of an access key 410 include, but are not limited to, encryption keys, hashing keys, private keys, public keys, or any other suitable type of key. In one embodiment, each data block 110 may be associated with the same access key 410. In this case, the data control engine 106 can use the same access key 410 to encrypt and decrypt all of the data blocks 110 that are associated with a data file 108. In another embodiment, each data block 110 may be associated with a different access key 410. In this case, the data control engine 106 encrypts and decrypts each data block 110 using its respective access key 410. This configuration provides increased information security because in the event that an access key 410 is obtained by a bad actor, the bad actor will be unable to access all of the data blocks 110 for a data file 108. This means that the bad actor will be unable to access all of the information within a data file 108 without the other access keys 410. The data control engine 106 may store the association between each data block 110 and their respective access key 410 in the data information table 400. Returning to the example in FIG. 4, each of the data blocks 110 is associated with a different access key 410 in the data information table 400. Data block A is linked with Key 1, data block B is linked with Key 2, data block C is linked with Key 3, and so on.

Returning to FIG. 2 at step 210, the data control engine 106 encrypts each data block 110 using their respective access key 410. Here, the data control engine 106 encrypts or obfuscates each of the data blocks 110 using their respective access keys 410. For example, the data control engine 106 may apply an encryption key or a hashing key to a data block 110 to mask the actual value of the data block 110. Returning to the example in FIG. 3, the data control engine 106 may apply an access key 410 to a data block 110 to generate an encrypted or obfuscated data block 110 (shown as data block 302). In this example, the binary string value of the data block 110 is changed to a different value.

Returning to FIG. 2 at step 212, the data control engine 106 stores each encrypted data block 110 in memory (e.g. memory 604). For example, the data control engine 106 may distribute and store each of the encrypted data blocks 110 in a different location within a memory. In one embodiment, the data control engine 106 is configured to store the encrypted data blocks 110 such that they are not stored contiguously or sequentially in memory. In other words, the data control engine 106 may store the encrypted data blocks 110 such that they are not adjacent to each other memory. In this configuration, the location of one encrypted data block 110 is independent from other encrypted data blocks 110.

At step 214, the data control engine 106 stores location information 408 for each data block 110 in the data information table 400. The location information 408 identifies a location where a data block 110 is stored in memory. As an example, location information 408 may comprise a memory address that identifies a location on a memory where a data block 110 is stored. In other examples, the location information 408 may comprise any other suitable type of information that identifies the location where a data block 110 is stored. Returning to the example in FIG. 4, the data control engine 106 links each data block 110 with its corresponding location information 408. For example, data block A is linked with location 1 in memory, data block B is linked with location 2 in memory, data block C is linked with location 3 in memory, and so on.

In some embodiments, the data information table 400 may be configured to associate reference tags 402, file identifiers 404, data block identifiers 406, location information 408, access keys 410, security flags 412, file keys 414, any other information, and/or combination of information.

Security flags 412 indicate whether a corresponding data block 110 has been tampered with or has previously failed decryption. For example, in the event that a bad actor attempts to decrypt a data block 110 and fails, the data access control engine 106 may set the security flag 410 to indicate that the data block 110 has been tampered with. This feature allows the data control engine 106 to track which data blocks 110 have been attacked by a bad actor to prevent other related data blocks 110 from being accessed by a bad actor. Returning to the example in FIG. 4, the data control engine 106 may use a flag bit (i.e. a binary value) to indicate whether a data block 110 has been tampered with or has previously failed decryption. A security flag 412 value of zero indicates that a data block 110 has not been tampered with and a security flag 412 value of one indicates that a data block 110 has been tampered with. In this example, the security flag 412 for data block G indicates that this data block 110 has been tampered with. In other embodiments, the data control engine 106 may use any other suitable type of value for indicating whether 110 has been tampered with or has previously failed decryption. For example, a security flag 412 may be set to a percentage or score that indicates the likelihood that a data block 110 has been compromised or access by a bad actor.

Examples of a file key 414 include, but are not limited to, encryption keys, hashing keys, private keys, public keys, or any other suitable type of key. File keys 414 may be used for encrypting and decrypting all of the data blocks 110 for a data file 108. For example, the data control engine 106 may use a file key 414 to encrypt a set of data blocks 110 that are associated with a data file 108 after the data control engine 106 encrypts each of the data blocks 110 with their respective access keys 410. In this example, the file key 414 is used to provide multiple layers of encryption since each data block 110 is encrypted using both an access key 410 and the file key 414. This provides increased information security because a bad actor will need to obtain both keys in order to gain access to a data block 110.

Data File Decryption Process

Figure 5:
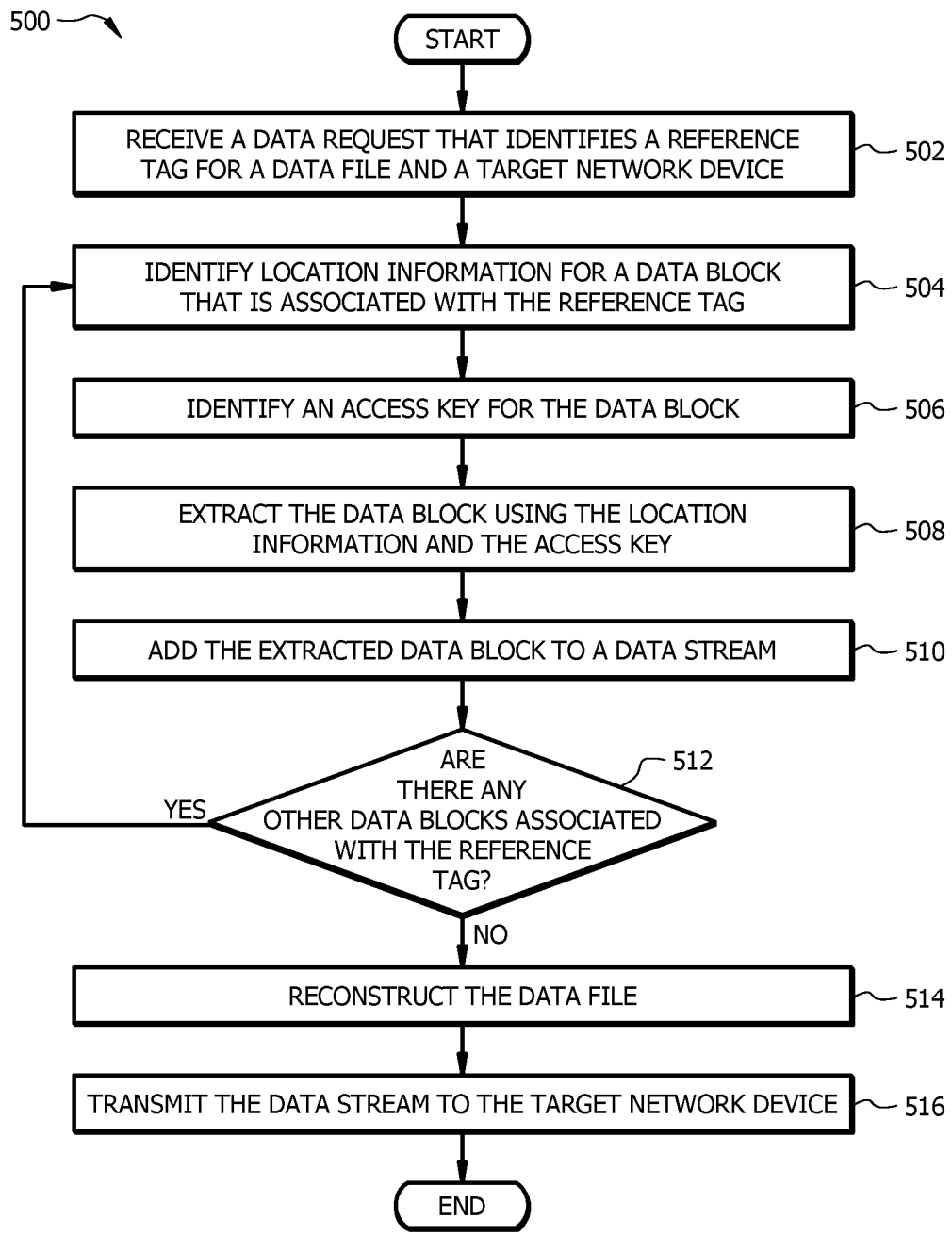
FIG. 5 is a flowchart of an embodiment of an encrypted data retrieval method.

FIG. 5 is a flowchart of an embodiment of an encrypted data retrieval method 500. A data control engine 106 may employ method 500 to recover data files 108 that have been stored as a set of encrypted data blocks 110. The process allows the data control engine 106 to identify and decrypt data blocks 110 that are associated with a data file 108 which allows the data control engine 106 to access and recover the original data file 108.

At step 502, the data control engine 106 receives a data request 112 that identifies a reference tag 402 and a target network device 104. For example, the data control engine 106 may receive a data request 112 from a network device 104 that requests one or more data files 108. The data request 112 may be in any suitable message format as would be appreciated by one of ordinary skill in the art.

At step 504, the data control engine 106 identifies location information 408 for a data block 110 that is associated with the reference tag 402. Referring to FIG. 4 as an example, the data request 112 may include a reference tag 402 with a value of "123" which indicates that the target network device 104 is requesting the data file 108 that corresponds with "File 1." The data control engine 106 identifies the first data block 110 that is associated with the reference tag 402. In this example, the data control engine 106 identifies data block A as the first data block 110 that is associated with the reference tag 402. The data control engine 106 then identifies the location information 408 (i.e. Location 1) that is associated with the identified data block 110.

Returning to FIG. 5 at step 506, the data control engine 106 identifies an access key 410 that is associated with the data block 110. Here, the data control engine 106 identifies the access key 410 that was used to encrypt the data block 110 so that it can be used decrypt and recover the original data block 110 value. Returning to the example in FIG. 4, the data control engine 106 identifies the access key 410 (i.e. Key 1) that is linked with data block A.

Returning to FIG. 5 at step 508, the data control engine 106 extracts the data block 110 using the location information 408 and the access key 410. Here, the data control engine 106 uses the location information 408 to retrieve the data block 110 from memory. The data control engine 106 then uses the identified access key 410 to decrypt and recover the original data block 110 values. For example, the data control engine 106 may apply the access key 410 to the data block 110 to de-obfuscate or decrypt the data block 110. Referring to FIG. 3 as an example, the data control engine 106 may apply the access key 410 to an encrypted data block 302 to recover the original value of a data block 110. In this example, each data block 110 is associated with a different access key 410. This means that the data control engine 106 uses a different access key 410 to decrypt each data block 110.

In some embodiments, the data control engine 106 may be configured to use a file key 414 to complete the decryption of a data block 110. Returning to the example in FIG. 4, the data control engine 106 may determine whether the data block 110 is associated with a file key 414 that was used to encrypt the data block 110. Continuing with the previous example, the data control engine 106 determines that data block A is not associated with a file key 414, and therefore, does not need to be further decrypted after decrypting the data block 110 with the access key 410. In FIG. 4, data blocks D-H are each associated with a file key 414 (i.e. Key 10). In this case, the data control engine 106 would obtain the associated file key 414 and use the file key 414 to further decrypt a data block 110 after decrypting the data block 110 with its access key 410. In one embodiment, the data control engine 106 may decrypt a data block 110 using a combination of an access key 410 and a file key 414. For example, the access key 410 and the file key 414 each form a portion of a master key and may be combined to generate the master key that can be used to decrypt a data block 110.

In one embodiment, the data control engine 106 is configured to decrypt a data block 110 after determining that the data block 110 has not previously failed decryption. For example, the data control engine 106 may check the security flag 412 that is associated with a data block 110 to determine whether the data block 110 has previously failed decryption. In this example, the data control engine 106 a security flag 412 with a value of zero indicates that the data block 110 has not previously failed decryption. In this case, the data control engine 106 will decrypt the data block 110 in response to determining that the data block 110 has not previously failed decryption. In the event that a security flag 412 has a value of one, which indicates that the data block 110 has previously failed decryption, then the data control engine 106 may terminate method 500 and may report that one or more data blocks 110 for the requested data file 108 have been compromised.

Returning to FIG. 5 at step 510, the data control engine 106 adds the extracted data block 110 to a data stream 114. The data control engine 106 uses each of the recovered data blocks 110 to reconstruct and reassemble the requested data file 108. Once the data control engine 106 reconstructs the data file 108, the data control engine 106 may transmit the data file 108 as a data stream 114 to the target network device 104.

At step 512, the data control engine 106 determines whether there are any other data blocks 110 associated with the reference tag 402. Here, the data control engine 106 determines whether all of the data blocks 110 that are associated with the request data file 108 have been recovered. The data control engine 106 returns to step 504 in response to determining that there are other data blocks 110 remaining that are associated with the reference tag 402. Continuing with the previous example in FIG. 4, the data control engine 106 may return to step 504 to recover data block B and data block C.

Returning to FIG. 5, the data control engine 106 proceeds to step 514 in response to determining that there are no more data blocks 110 remaining that are associated with the reference tag 402. Here, the data control engine 106 determines that all of the data blocks 110 associated with a data file 108 have been recovered. At step 514, the data control engine 106 reconstructs the data file 108 using the recovered data blocks 110. For example, the data control engine 106 may recombine the data blocks 110 together to recover the original binary string that corresponds with the original data file 108. Referring to FIG. 3 as an example, the data control engine 106 may concatenate data blocks 110 together to reconstruct the original binary string that represents a data file 108.

Returning to FIG. 5 at step 516, the data control engine 106 transmits the data stream 114 that comprises the data file 108 and its data blocks 110 to the target network device 104. The data stream 114 may comprise one or more data files 108. Referring to FIG. 1 as an example, the data control engine 106 may transmit a data stream 114 that comprises a first data file 108A and a second data file 108B. In this example, the first data file 108A comprises a first set of data blocks 110A (i.e. data block A, data block B, and data block C) and the second data file 108B comprises a second set of data blocks 110B (i.e. data block D, data block E, data block F, data block G, and data block H). The data control engine 106 may transmit the data steam 114 to the target network device 104 using any suitable technique or protocol as would be appreciated by one of ordinary skill in the art.

Network Device Hardware Configuration

Figure 6:
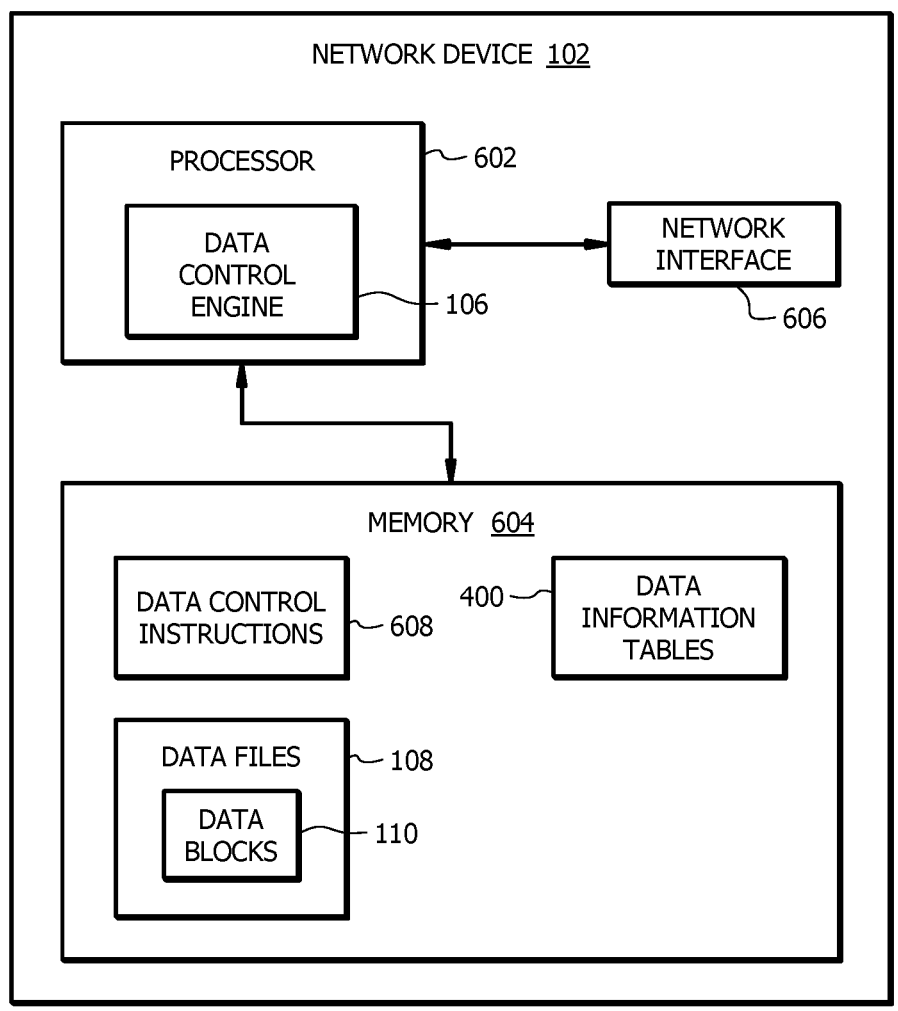
FIG. 6 is an embodiment of a device configured to provide information security using data block level encryption.

FIG. 6 is an embodiment of a device (e.g. network device 102) configured to provide information security using data block level encryption. The network device 102 comprises a processor 602, a memory 604, and a network interface 606. The network device 102 may be configured as shown or in any other suitable configuration.

The processor 602 comprises one or more processors operably coupled to the memory 604. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 604. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a data control engine 106. In this way, processor 602 may be a special purpose computer designed to implement the functions disclosed herein. In an embodiment, the data control engine 106 is implemented using logic units, FPGAs, ASICs, DSPs, or any other suitable hardware. The data control engine 106 is configured operate as described in FIGS. 1-5. For example, the data control engine 106 may be configured to perform the steps of method 200 and 500 as described in FIGS. 2 and 5.

The memory 604 comprises one or more disks, tape drives, or solid-state drives, and may be used as an over-flow data storage device, to store programs when such programs are selected for execution, and to store instructions and data that are read during program execution. The memory 604 may be volatile or non-volatile and may comprise read-only memory (ROM), random-access memory (RAM), ternary content-addressable memory (TCAM), dynamic random-access memory (DRAM), and static random-access memory (SRAM).

The memory 604 is operable to store data control instructions 608, data files 108, data blocks 110, data information tables 400, and/or any other data or instructions. The data control instructions 608 may comprise any suitable set of instructions, logic, rules, or code operable to execute the data control engine 106. The data files 108, data blocks 110, and data information tables 400 are configured similar to the data files 108, data blocks 110, and data information tables 400 described in FIGS. 1-5, respectively.

The network interface 606 is configured to enable wired and/or wireless communications. The network interface 606 is configured to communicate data between the network device 102 and other devices (e.g. user devices and/or network devices in the network), systems, or domain. For example, the network interface 606 may comprise a WIFI interface, a LAN interface, a WAN interface, a modem, a switch, or a router. The processor 602 is configured to send and receive data using the network interface 606. The network interface 606 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An information security device, comprising:
a data control engine implemented by a processor operably coupled to a memory, configured to:
  receive a data file;
  segment the data file into a set of data blocks, wherein each data block from the set of data block comprises a portion of data from the data file;
  associate the set of data blocks with a reference tag, wherein:
    the reference tag comprises an alphanumeric value that uniquely identifies each of the set of data blocks that are associated with the data file; and
    each data block within the set of data blocks is associated with the reference tag with the same alphanumeric value as each other that uniquely identifies each of the set of data blocks that are associated with the data file;
  identify an access key for encrypting each data block from the set of data blocks;
  encrypt each of the set of data blocks with a different corresponding access key;
  associate each encrypted data block from the set of encrypted data blocks associated with the data file with the reference tag having the same alphanumeric value as each other, wherein each encrypted data block of the data file is associated with a data block identifier and a different access key in a data information table;
  store each of the set of encrypted data blocks with non-sequential location information in a memory, wherein the non-sequential location information is stored in a sequential order of data block identifiers of the encrypted data blocks of the data file in the data information table;
  iteratively identify the non-sequential location information of each of the encrypted data blocks of the data file based on the reference tag having the same alphanumeric value as each other;
  extract each of the set of encrypted data blocks of the data file based on the non-sequential location information and each different corresponding access key; and
  reconstruct the data file in the sequential order of the data block identifiers of the data file with the reference tag having the same alphanumeric value as each other; and
the memory operably coupled to the processor, operable to store:
  the set of encrypted data blocks;
  an association between each data block identifier of the set of encrypted data blocks of the data file and the reference tag having the same alphanumeric value in the data information table;
  an association between each of the set of encrypted data blocks and each different access key in the data information table; and
  an association between each encrypted data block and the different corresponding location information for each of the set of encrypted data blocks in the sequential order of the data block identifier of the encrypted data blocks associated with the data file in the data information table, wherein the location information comprises a unique non-sequential memory address that identifies a location in the memory where each encrypted data block is stored.

2. The system of claim 1, wherein the data control engine is further configured to:
identify a file key for encrypting the data file; and
encrypt the set of data blocks using the file key after encrypting each data block from the set of data blocks with a corresponding access key.

3. The system of claim 1, wherein the data control engine is further configured to:
identify a file key for encrypting the data file; and
encrypt the set of data blocks using a combination of the file key and a corresponding access key.

4. The system of claim 1, wherein:
the data file is represented as a numeric string of values;
segmenting the data file into a set of data blocks comprises partitioning the numeric string of values into substrings of numeric values; and
each substring of numeric values corresponds with a data block.

5. The system of claim 1, wherein the data control engine is further configured to:
detect a decryption attempt for a first data block from the set of data blocks;
determine that the decryption attempt has failed; and
set a security flag for the first data block from the set of data blocks to indicate that the first data block has failed decryption.

6. The system of claim 1, wherein encrypting each data from the set of data blocks comprises each data block with a different access key.

7. The system of claim 1, wherein encrypting each data from the set of data blocks comprises each data block with the same access key.

8. A data encryption method, comprising:
receiving a data file;
segmenting the data file into a set of data blocks wherein each data block from the set of data block comprises a portion of data from the data file;
associating the set of data blocks with a reference tag, wherein:
the reference tag comprises an alphanumeric value that uniquely identifies each of the set of data blocks that are associated with the data file; and
each data block within the set of data blocks is associated with the reference tag with the same alphanumeric value as each other that uniquely identifies each of the set of data blocks that are associated with the data file;
storing an association between each of the set of data blocks and the same reference tag in a data information table in a memory;
identifying an access key for encrypting each data block from the set of data blocks;
encrypting each of the set of data blocks with a different corresponding access key;
storing an association between each encrypted data block in the set of encrypted data blocks with the reference tag having the same alphanumeric value as each other, wherein each encrypted data block of the data file is associated with a data block identifier and a different access key in the data information table;
storing each of the set of encrypted data blocks non-sequential location information in the memory, wherein the non-sequential location information is stored in a sequential order of data block identifiers of the encrypted data blocks of the data file in the data information table;
iteratively identifying the non-sequential location information of each of the encrypted data blocks of the data file based on the reference tag having the same alphanumeric value as each other;
extracting each of the set of encrypted data blocks of the data file based on the non-sequential location information and each different corresponding access key; and
reconstructing the data file in the sequential order of the data block identifiers of the data file with the reference tag having the same alphanumeric value as each other.

9. The method of claim 8, further comprising:
identifying a file key for encrypting the data file; and
encrypting the set of data blocks using the file key after encrypting each data block from the set of data blocks with a corresponding access key.

10. The method of claim 8, further comprising:
identifying a file key for encrypting the data file; and
encrypting the set of data blocks using a combination of the file key and a corresponding access key.

11. The method of claim 8, wherein:
the data file is represented as a binary string of values;
segmenting the data file into a set of data blocks comprises partitioning the binary string of values into substrings of binary values; and
each substring of binary values corresponds with a data block.

12. The method of claim 8, further comprising:
detecting a decryption attempt for a first data block from the set of data blocks;
determining that the decryption attempt has failed; and
setting a security flag for the first data block from the set of data blocks to indicate that the first data block has failed decryption.

13. The method of claim 8, wherein encrypting each data from the set of data blocks comprises each data block with a different access key.

14. The method of claim 8, wherein encrypting each data from the set of data blocks comprises each data block with the same access key.

15. A non-transitory computer readable medium that stores instructions that when executed by a processor causes the processor to:
receive a data file;
segment the data file into a set of data blocks wherein each data block from the set of data block comprises a portion of data from the data file;
associate the set of data blocks with a reference tag, wherein:
the reference tag comprises an alphanumeric value that uniquely identifies each of the set of data blocks that are associated with the data file; and
each data block within the set of data blocks is associated with the reference tag with the same alphanumeric value as each other that uniquely identifies each of the set of data blocks that are associated with the data file;
store an association between each of the set of data blocks and the same reference tag in a data information table in a memory;
identify an access key for encrypting each data block from the set of data blocks;
encrypt each of the set of data blocks with a different corresponding access key;

store an association between each encrypted data block in the set of encrypted data blocks with the reference tag having the same alphanumeric value as each other, wherein each encrypted data block of the data file is associated with a data block identifier and a different access key in the data information table;

store each of the set of encrypted data blocks with non-sequential location information in a memory, wherein the non-sequential location information is stored in a sequential order of data block identifiers of the encrypted data blocks of the data file in the data information table;

iteratively identify the non-sequential location information of each of the encrypted data blocks of the data file based on the reference tae having the same alphanumeric value as each other;

extract each of the set of encrypted data blocks of the data file based on the non-sequential location information and each different corresponding access key; and reconstruct the data file in the sequential order of the data block identifiers of the data file with the reference tag having the same alphanumeric value as each other.

16. The non-transitory computer-readable medium of claim 15, wherein the instructions when executed by the processor further causes the processor to:

identify a file key for encrypting the data file; and encrypt the set of data blocks using the file key after encrypting each data block from the set of data blocks with a corresponding access key.

17. The non-transitory computer-readable medium of claim 15, wherein the instructions when executed by the processor further causes the processor to:

identify a file key for encrypting the data file; and encrypt the set of data blocks using a combination of the file key and a corresponding access key.

18. The non-transitory computer-readable medium of claim 15, wherein:

the data file is represented as a binary string of values;

segmenting the data file into a set of data blocks comprises partitioning the binary string of values into substrings of binary values; and each substring of binary values corresponds with a data block.

19. The non-transitory computer-readable medium of claim 15, wherein the instructions when executed by the processor further causes the processor to:

detect a decryption attempt for a first data block from the set of data blocks;

determine that the decryption attempt has failed; and set a security flag for the first data block from the set of data blocks to indicate that the first data block has failed decryption.

20. The non-transitory computer-readable medium of claim 15, wherein encrypting each data from the set of data blocks comprises each data block with a different access key.

* * * * *